United States Patent [19]

Kvavle

[11] Patent Number: 4,901,906
[45] Date of Patent: Feb. 20, 1990

[54] METHOD FOR FORMING COMPOSITE METAL ARTICLES

[76] Inventor: Robert C. Kvavle, Rte. 4, Box 891, Hillsboro, Oreg. 97123

[21] Appl. No.: 270,278

[22] Filed: Nov. 14, 1988

Related U.S. Application Data

[63] Continuation of Ser. No. 155,609, Feb. 12, 1988, Pat. No. 4,815,652.

[51] Int. Cl.$^4$ .............................................. B23K 20/02
[52] U.S. Cl. ...................................... 228/176; 29/445; 72/364; 164/76.1; 164/106
[58] Field of Search ........................ 164/76.1, 98, 106; 29/445, 527.5; 72/700, 364, 258; 228/155, 176

[56] References Cited

U.S. PATENT DOCUMENTS

| | | | |
|---|---|---|---|
| 2,261,412 | 11/1941 | Reeve | 29/527.5 X |
| 2,505,896 | 5/1950 | Hedlund | 228/155 X |
| 2,871,558 | 2/1959 | Colbeck | 228/155 X |
| 2,893,083 | 7/1959 | Ladd | 164/106 X |
| 3,007,219 | 11/1961 | Jepson | 164/106 |
| 3,184,945 | 5/1965 | Hornak et al. | 72/700 X |
| 3,619,310 | 11/1971 | Clarke | 228/155 |

Primary Examiner—Nicholas P. Godici
Assistant Examiner—J. Reed Batten, Jr.

[57] ABSTRACT

A composite metal article is made by placing a low melting temperature metal to serve as a core within a shell of a high melting temperature metal and by containing and sealing the core within the shell. The assembly constitutes a containerized ingot which is then transported to a forming die where the containerized ingot is heated to soften the core and is then formed to the shape imposed by the die. During the cooling period, the shell is reformed to the core to maintain tight contact and to promote bonding.

10 Claims, 6 Drawing Sheets

METHOD FOR FORMING COMPOSITE METAL ARTICLES

This application is a continuation in part of application Ser. No. 07/155,609 filed Feb. 12, 1988 and now U.S. Pat. No. 4,815,652, issued Mar. 28, 1989.

BACKGROUND OF INVENTION

The present invention pertains to the art of casting and forming composite metal articles, and more particularly to the containment of a molten metal in a metal shell which is engaged by one or more forming dies and formed to a desired shape.

Heretofore, steel and other metals with the desired characteristics of high strength, hardness, and corrosion resistance have been cast in molds of sand or ceramic because of the high temperature melting point of these metals. The molds required for these processes must be made on an individual basis using labor intensive methods. The casting process, itself, is likewise labor intensive and extensive secondary operations to clean and trim the castings are required. The furnaces and attendant equipment must operate at very high temperatures which makes for high equipment cost and high maintenance costs. All of which, when combined with the high cost per pound of heavy casting materials, result in castings of high cost and excessive weight.

The die casting of low melting temperature metals such as aluminum and zinc alloys is a widely used process that addresses some of the problems by utilizing resusable steel dies operated at lower temperatures. While this produces castings of light weight with closer dimensional control and better surface finish, the use of such low melting temperature materials is much restricted by low strength, lack of wear resistance, and poor corrosion resistance.

Attempts have been made to cast steel alloys in metal dies made of very high melting temperature metals in processes similar to that of die casting low melting temperature materials, but the charge of molten steel must be cast at so high a temperature that the surfaces of the dies are severely stressed by thermal shock and the dies breakdown after limited use. Also, the very high melting temperature metals from which the dies are made, are expensive and are difficult to machine into the required die shapes. Accordingly, such processes for casting high temperature metals have not met with wide acceptance.

Efforts have been made to overcome these problems by casting bimetallic products. Some examples are die casting of aluminum around steel inserts; rolling or explosion bonding of aluminum and steel in flat bimetal pieces or sheets; and electroplating or hot dipping a molten metal on a base metal. These methods are each servicable in a limited range of application but are severely limited in one or more areas of performance such as product size and shape, structural strength, and corrosion protection.

Heretofore, methods for casting bimetallic products have only been successful in obtaining a structurally sound metallurgic bond between those metals having nearly the same coefficient of thermal expansion or in those articles in which the metal with the lower coefficient of thermal expansion is positioned interior to the metal with the higher coefficient of thermal expansion. This relative position will cause the outer metal to shrink more upon cooling and in so doing, tighten upon the inner metal to form a secure joint. Composite metal forms in which the metal with the higher coefficient of thermal expansion is the interior metal, result in the interior metal drawing away from the exterior metal thus creating stress and possible voids at the bonding interface of the two metals.

Another limitation of present methods of die casting is that the dies are required to come in direct contact with the molten metal to contain and form it. This requires dies with precise dimensions, smooth surface finish, and full enclosure of the molten metal. Therefore, the dies are expensive.

Yet another problem with present methods is that of removing oxides from the bonding surfaces of the metals to be joined. The highly reactive nature of such metals as aluminum and the high melting temperature of its oxide makes oxide removal and the prevention of its subsequent formation an expensive and difficult operation.

SUMMARY OF THE INVENTION

Accordingly, it is an object of the present invention to provide a method of producing a composite metal article with an improved metallurgical bond between an inner core metal and an outer metal shell in which the metal comprising the core has a higher coefficient of thermal expansion and a lower melting point than the metal comprising the shell. It is another object of the present invention to provide a cost effective, manufacturing method of removing oxides from the bonding surfaces of companion metals. It is yet another object of the present invention to provide a rapid, low cost method to cast and form containerized ingots. It is a further object of the present invention to provide a method which will allow a final use manufacturer to select from a range of containerized ingot sizes and shapes furnished by a primary supplier to simplify the process requirements at final use. It is yet a further object of the present invention to provide a manufacturing method that will utilize dies of low cost construction.

In accordance with the present invention a composite metal article is made by placing a low melting temperature metal to serve as a core within a shell of a high melting temperature metal and containing and sealing the core within the shell. The core may be placed in the shell either by pouring it as a molten metal or placing it as a solid within a part of the shell previously shaped to contain it and then covering it with the remaining part of the shell to make up a containerized ingot which is then transported to a forming die where the containerized ingot is heated to soften the core and is then formed to the shape imposed by the die.

Alternately, the core metal may be injected in a molten condition or extruded in a plastic condition into a shell which has been shaped with entry and exit ports and configured so that the molten or plastic core metal may pass through the cavity of the shell, scour the inner surfaces of the shell and discharge the loosened oxides through the scavenging ports with the excess of core metal. The scavenging ports and the injection ports are thereafter closed to make a containerized ingot which is then transported to a forming die where it is heated and formed to a shape for final use.

In yet another method, the core metal may be injected into the shell which has been placed and contained in a forming die such that when subjected to hydraulic pressure generated during the injection of the molten metal the shell expands to form against the die.

After a containerized ingot having a core with a higher coefficient of thermal expansion than the shell has been formed to the approximate shape required for final use, the shell is reformed by the forming die or by auxiliary dies to be compressed in upon the core as it shrinks in cooling. Depending on the complexity of the casting, this may be done over the whole surface of the shell or may be done in localized areas only.

DESCRIPTION OF THE PREFERRED EMBODIMENTS

Figure 1:
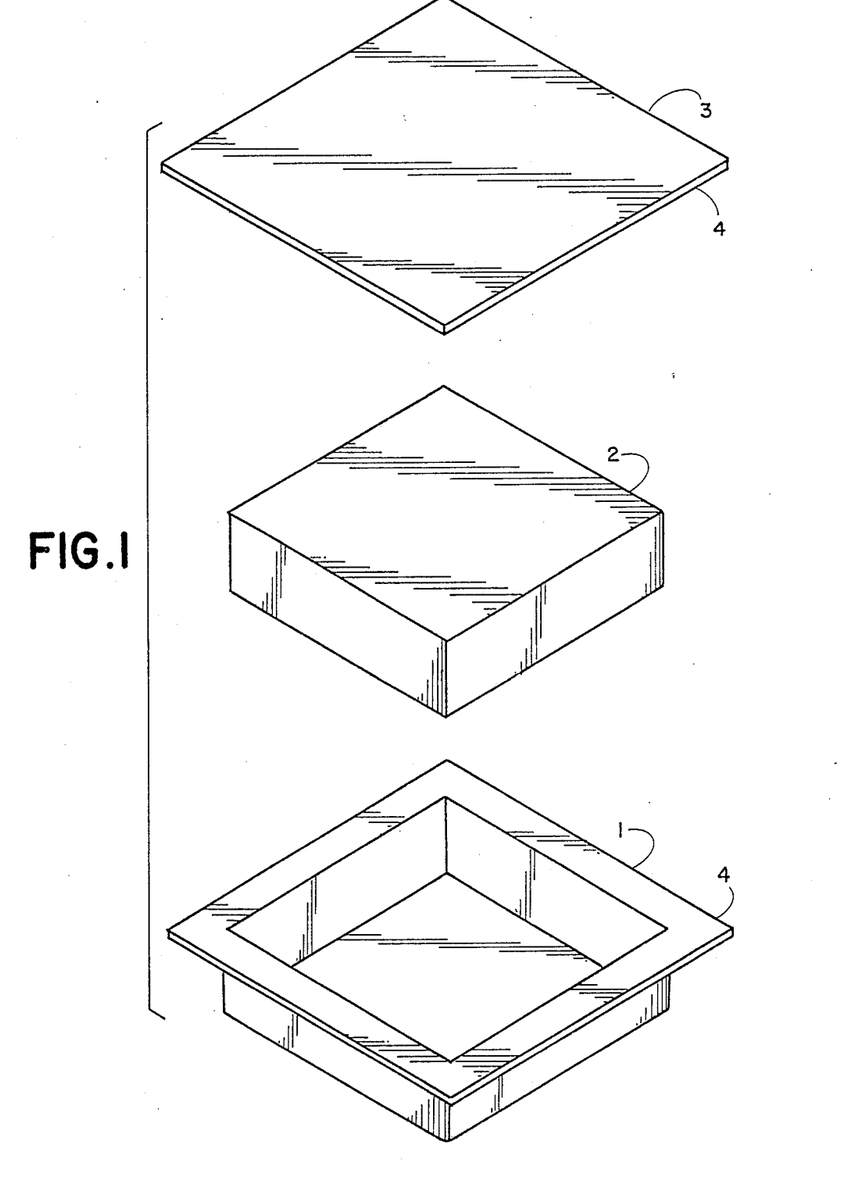
FIG. 1 is an exploded perspective view of the parts used to make a containerized ingot
Figure 2:
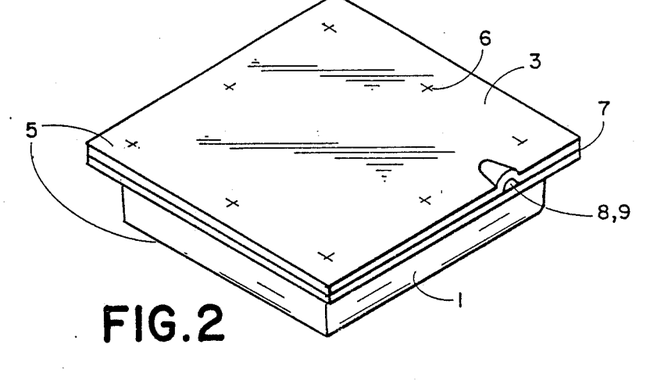
FIG. 2 is a perspective view of the assembled containerized ingot and of fastening methods to secure the cover.

Referring to FIG. 1, there are shown an open container 1, formed from a thin sheet of a relatively high melting point material, such as an alloy of stainless steel with a melting point of approximately 2600 F. deg., a core 2, composed of a metal with a relatively low melting point such as an aluminum alloy having a melting point of approximately 1220 F. deg., and a cover 3 composed of a relatively high melting point metal which may be of the same metal as that of the container. The container 1, and cover 3, cooperating together constitute a shell 4, which encloses the core 2. FIG. 2 shows the parts of FIG. 1 assembled to make a containerized ingot 5. The cover 3 may optionally be fastened to container 1 with spot welds 6 or continuously welded at joint 7 or soldered at joint 7 with a low melting temperature material. A scavenging port 8 is preshaped in the cover and is closed with a plug 9 of low melting temperature material.

The containerized ingot 5 is used in the forming process of a composite metal article now to be described.

Figure 3:
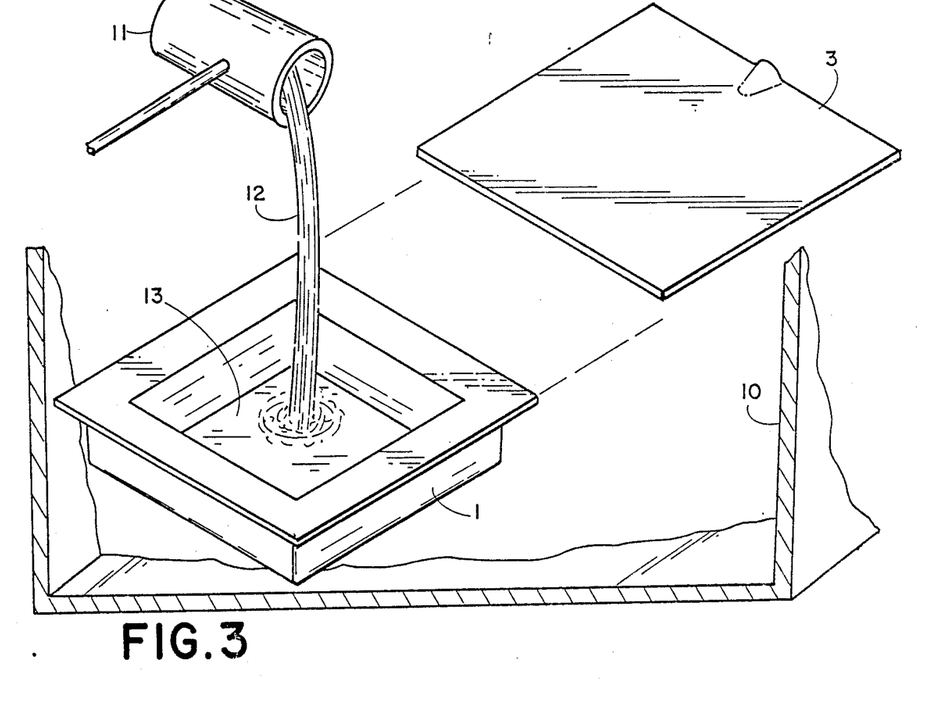
FIG. 3 is a perspective view of the apparatus and parts used in a method to make a containerized ingot.

A method to make the containerized ingot 5 of FIG. 2, is illustrated in FIG. 3 in which the whole apparatus is placed in an enclosure 10 containing an argon atmosphere. Wherein a ladle 11 containing molten aluminum from which surface oxides have been skimmed, pours molten aluminum 12 into cavity 13 of container 1 until the cavity is filled. After which, cover 3 is placed on top of container 1 and is pressed firmly to it until the aluminum has solidified. A plug 9 of a suitable low temperature material such as aluminum is then placed in scavenging port 8 and the exposed joints may then be optionally coated with a resin to seal the joints or the cover may be spot welded 6 or continuously welded 7 as previously described and illustrated in FIG. 2. Aluminum and stainless steel will join together under heat and pressure by an action which consists of the diffusion of molecules to create a bond at the interface of the two metals. This action when structurally supported by firm and continuing mechanical contact through the cooling period of the casting permits a cohesion of the two metals which is referred to in this application as a metallurgical bond. The compound of these two metals is brittle and of low strength, therefore it is desirable to keep the casting temperature low and the cooling period as short as possible.

For those bimetallic articles requiring a metallurgic bond between the shell and core, the stainless steel container 1 and cover 3 may be treated with a solution of muriatic acid to remove surface oxides and placed within enclosure 10 which contains an inert atmosphere such as argon to prevent the formation of oxides. Molten aluminum is then poured into cavity 13 from ladle 11 which has before been skimmed free of oxides while in the confines of enclosure 10.

The container 1 and cover 3, together, make up a shell 4 which, when filled with molten metal, constitutes a containerized ingot 5 which may immediately be formed in a die or, alternately, may be allowed to cool to a solid form to permit transportation to a die in another location where it is then reheated to permit forming.

The reheating of the containerized charge, when suitably sealed, may take place in a conventional controlled atmosphere furnace in the presence of an endothermic atmosphere operating at 1500 F. deg. in which the atmosphere constituents are approximately 20% carbon monoxide, 40% hydrogen, 39% nitrogen, and ½% methane.

In an alternate method the containerized ingot 5 shown in FIG. 2 is assembled with a core made by die casting or by cutting from an extruded shape the aluminum ingot 2 shown in FIG. 1. which is placed, in solid form, in container 1 and enclosed in cover 3.

In those castings requiring a metallurgic bond between the shell and core of the composite metal article, the stainless steel container 1 and cover 3 are treated with a solution of muriatic acid to remove the surface oxides and are immediately placed within enclosure 10 which contains an inert atmosphere such as argon to prevent the formation of additional oxides. The aluminum ingot is cleaned and deoxidized in an electrolytic bath and then plated with 40-50 microinches of silver. The ingot is then placed in container 1 and cover 3 is placed on the container and is sealed while still in the argon atmosphere by welding a continuous stainless steel seam along the juncture between cover and container. A short section of the juncture is left unwelded with stainless steel and this is sealed with a suitable low melting temperature material such as aluminum.

Figure 4:
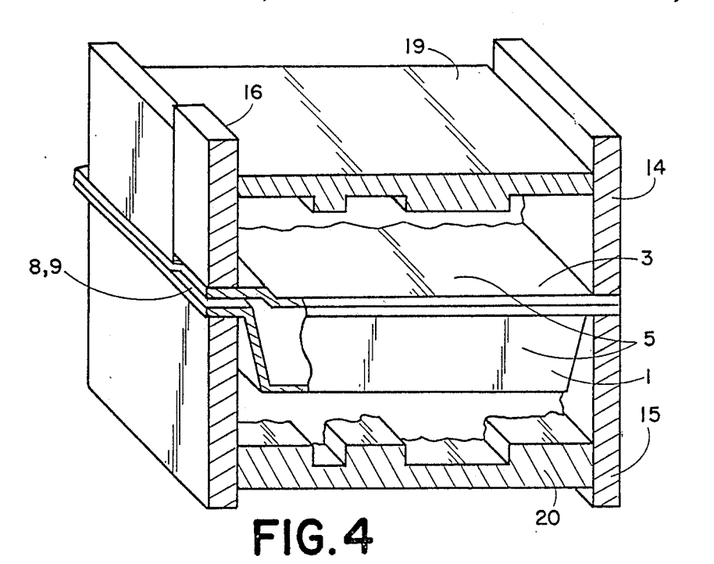
FIG. 4 is a partials sectional view showing key parts of an apparatus with a containerized ingot in place to be formed by a compressive force.

The containerized ingot 5, in a heated condition and in place to be formed, is shown in FIG. 4 with flange portions clamped between clamping mechanisms 14 and 15, by which the containerized ingot is held in position for shaping and by which it may also be sealed to prevent unwanted loss of molten metal through the joint formed by container 1 and cover 3 if that joint has optionally been left unwelded. A separate clamping member 16 is actuated independently to allow scavenging port 8 in cover 3 to remain open when plug 9 removes under heat and pressure until purging is completed whereupon clamping member 16 is actuated to press against cover 3 to depress that portion of the cover at scavenging port 8 tight against the surface of container 1 to close and seal the port.

Figure 5:
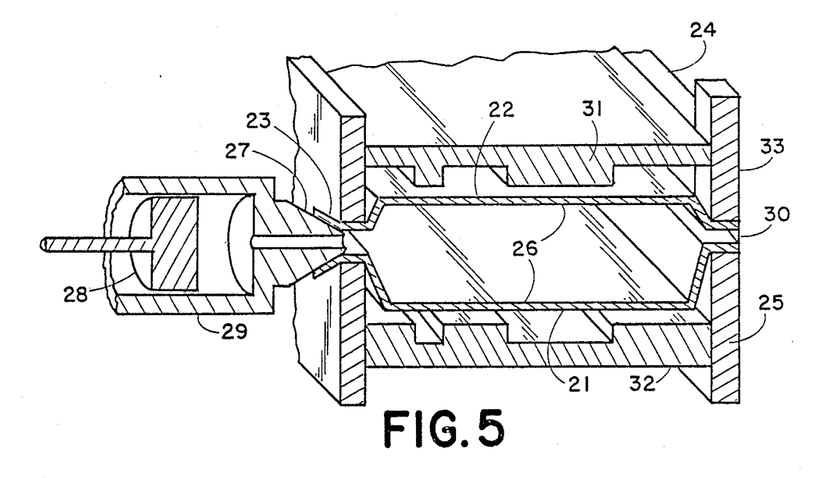
FIG. 5 is a partial sectional view showing key parts of an apparatus with a shell in place to be filled and formed by hydraulic pressure.

The shaping dies 19 and 20 are then activated to press against containerized ingot 5, causing some portions of it to be indented and some portions to be distended, thus acquiring a shape imparted by the die configuration and die motion. The initial shaping by a die with the core at full heat and prior to solidification of the core is the process step defined by the terms form, formed and-forming in this description and in the claims of this invention. FIG. 5 shows an alternate method of forming in which the container 21 and the cover 22 are preshaped to cooperatively establish a filling port 23 to receive molten metal. The container and cover are placed in a die and clamped by means 24 and 25 making together a sealed shell 26 to enclose a molten charge. The shell is engaged with and sealed to a molten metal injection nozzle 27 at filling port 23 through which molten aluminum is injected under hydraulic pressure generated by piston 28 slidably acting in cylinder 29. Depending on the composition and shape of the composite metal article to be formed, casting temperature may range from 1220 F. deg. to 2200 F. deg. and injection pressure may range upward from 4000 psi. Also preshaped in cover 22 is scavenging port 30 to allow escape of gases and of contaminants carried in the molten metal. After this occurs, the scavenging port is closed off by compressive action of the port closing plunger 33 which causes pressure to build up in the shell and initiates forming. The hydraulic pressure of the molten metal then expands shell 26 to press against and form to dies 31 and 32, which remain in fixed position during the forming operation.

Due to differences in the coefficients of thermal expansion, after the aluminum core solidifies it will continue to shrink and draw away from the stainless steel shell during the cooling period. For those castings with a suitably simple shape and with a thin enough shell, the forming dies 31 and 32 are acted upon with increased pressure to cause them to advance in upon the formed containerized ingot in a continuing manner throughout the cooling period to generally reform the shell so that it will press in upon and tightly fit the core. The terms reform, reformed, and reforming specifically define the shaping process of dies compressively acting on the containerized charge after forming and after solidification of at least part of the core and continuing throughout at least part of the cooling period thereafter.

For those conditions in which oxides have been excluded from the containerized ingot by the methods previously described and in which contact under pressure is continuously maintained during cooling, the aluminum and stainless steel diffuse together at their interface to create a metallurgic bond between the shell and the core of the composite metal article.

Figure 6:
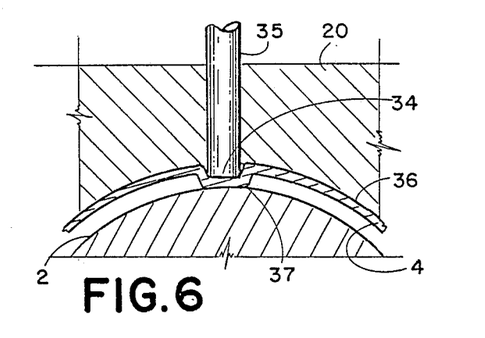
FIG. 6 is a partial section showing a portion of a forming die with a plunger reforming a spot indentation in the shell.

Those castings with a more intricate shape and with thicker shells may only permit reforming to be accomplished locally in spot indentations 34 as shown in FIG. 6 where such indentations are reformed by independently actuated plungers 35 mounted in the forming die 20 to indent the stainless steel shell 4 below the surface 36 formed at the moment of casting so as to seat the inner surface 37 of the spot indentation against the core 2.

Figure 7:
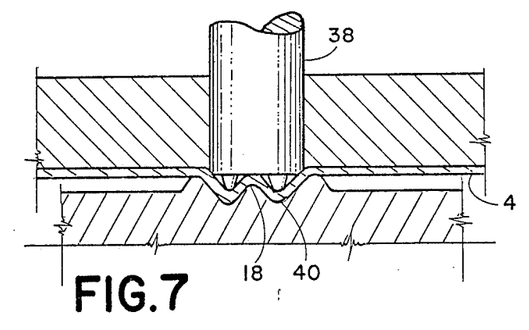
FIG. 7 is a partial section showing a portion of a forming die with a plunger reforming a close pattern of indentations in the shell and core.
Figure 8:
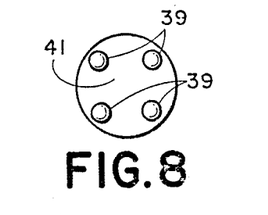
FIG. 8 is a face view of the reforming plunger shown in FIG. 7.

In a variation of the spot indentation method, indentations reformed in the surface 36 in shell 4 in FIG. 6 are tightly grouped as shown in section in FIG. 7. The pressing face of plunger 38, shown in FIG. 8, is shaped with a pattern 39 of projections and depressions that is impressed on the stainless steel shell; the projections on the plunger face serve to reform indentations 40 in the shell 4 and the depressions 41 on the plunger face allow for spaces between the indentations, which spaces are defined as the interstices 18 in the pattern of the indentations reformed in the shell and the core. The plunger 38, shown in FIG. 7, is activated to press in upon the shell 4 during the cooling period after initial forming and casting, and is actuated with sufficient force so as to reform both the shell and the surface layer of the core. The indentations reformed in the outer surface of the shell become projections on the inner surface of the shell that extend into the core and displace material in the surface layer of the core to plastically flow laterally and outwardly from the inner surface shell projections to fill the intertices 18 in the pattern of indentations and thereby establish an area of continuous contact between the shell and the core in the area of the pattern.

Figure 9:
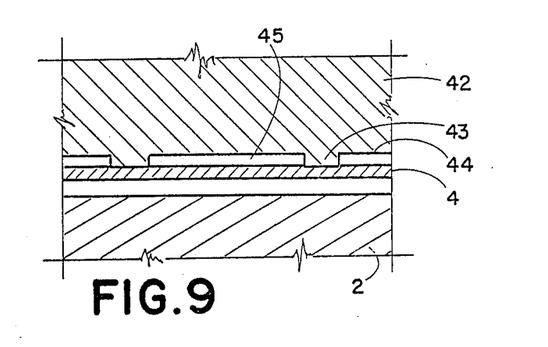
FIG. 9 is a partial section showing portions of the forming die with integral reforming projections, and with shell and core after forming has taken place but before solidification of the core.
Figure 10:
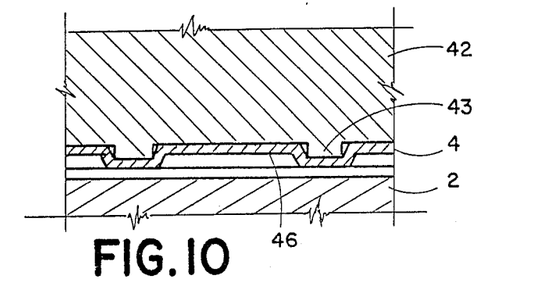
FIG. 10 is a partial section showing portions of the forming die with integral reforming projections, with the shell and core after cooling of the core and after reforming has taken place.
Figure 11:
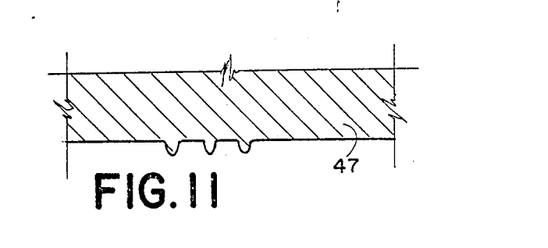
FIG. 11 is partial section of the forming die with integral reforming projections in a close pattern.
Figure 12:
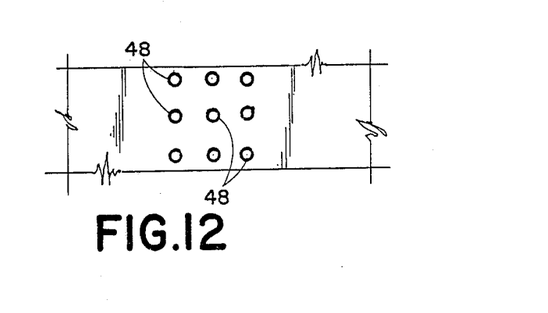
FIG. 12 is a face view of the reforming projections shown in FIG. 11.

An alternate shaping means, shown in FIG. 9 consists of integral form/reform dies 42, contoured to impart the final general configuration desired in the composite metal article on which fixed height, integral projections 43 of relatively small cross sectional area have been established on the shaping faces 44. The projections are spaced apart at a distance small enough to allow the shell structure to bridge the gap 45 without appreciable deflection between the projections when forming is performed at a relatively low pressure, and at a distance large enough to permit plastic deflection 46 of the shell shown in FIG. 10 as the relatively high pressure used for reforming is applied. The spacing of the projections, forming temperature, and forming and reforming pressures are interactive factors that vary with the shell thickness and the shape of the formed article. Therefore, these factors must be individually determined for each formed article The integral form /reform shaping means may also be constructed with the integral projections in die 47, shown in section in FIG. 11, and grouped in a pattern 48 as shown face view in FIG. 12.

Figure 13:
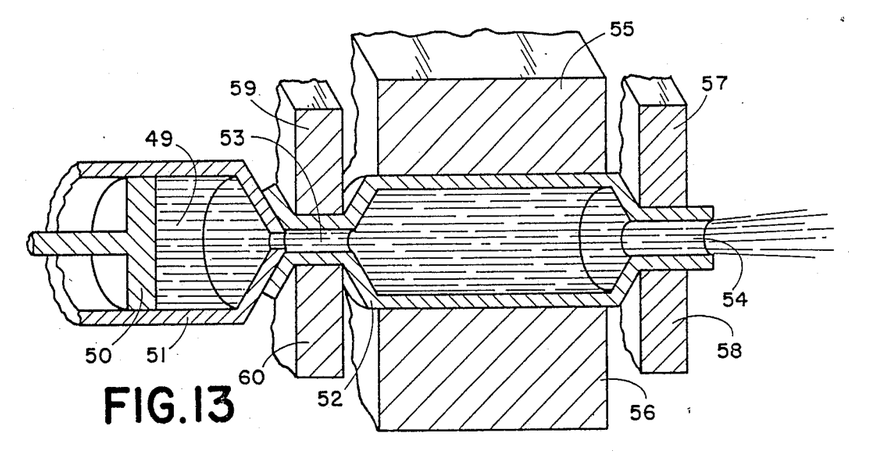
FIG. 13 is a partial sectional view showing key parts of an apparatus injecting molten core metal into a shell with provision for the discharge of excess core metal from the shell.

Another method for making containerized ingots is shown in FIG. 13. In this method a molten metal charge 49 of a low melting temperature metal such as aluminum is injected under pressure by a piston 50 from a cylinder 51 into a shell 52 shaped as a closed channel with injection port 53 and scavenging port 54. The shell is held in position by clamps 55 and 56. The molten charge is injected into the shell in excess such that the molten charge moves through the closed channel of the shell and scours the inner surfaces of the shell removing oxides and other contaminants which are carried in the charge and are discharged with the excess molten metal through the scavenging port. After scavenging is completed, The scavenging port is closed by scavenging port cut off 57 and 58. The pressure in the charge is built up by continued action of the piston which causes the charge to fill out and seat into the shell cavity after which the injection port is closed by injection port cut off 59 and 60. The resulting containerized ingot is then cooled and the closed injection and scavenging ports may optionally be sealed by one of the methods previously described.

Figure 14:
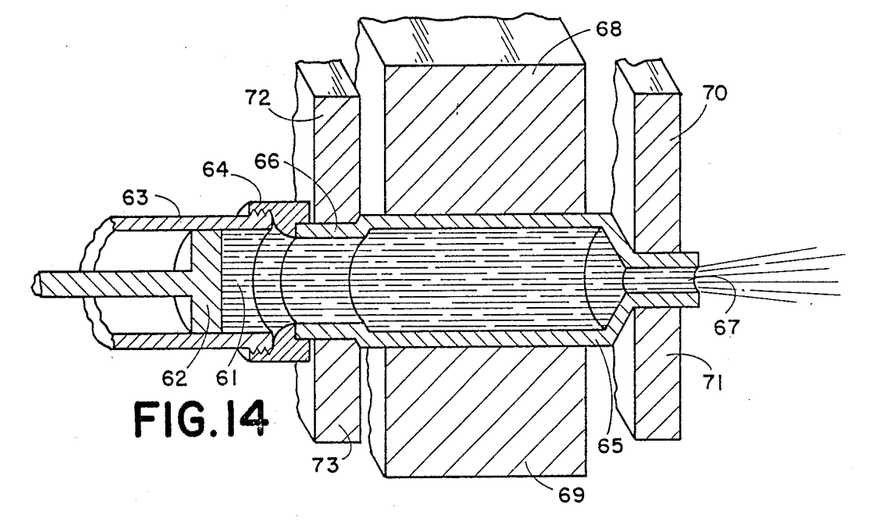
FIG. 14 is a partial sectional view showing key parts of an apparatus extruding plastic core metal into a shell with provision for the discharge of excess core metal from the shell.

Another method for making containerized ingots is shown in FIG. 14. In this method a plastic metal charge 61, of a low melting temperature metal such as aluminum is injected under pressure by a piston 62, from a cylinder 63, through an extrusion die 64, into a shell 65, shaped as a closed channel with injection port 66,and scavenging port 67. The shell is held in position by clamps 68 and 69. The charge is extruded into the shell in excess such that the charge moves through the closed channel of the shell and scours the inner surfaces of the shell removing oxides and other contaminants which are carried in the charge and are discharged with the excess extruded metal through the scavenging port. After scavenging is completed, the scavenging port is closed by scavenging port cut off 70 and 71. The pressure in the charge is built up by continued action of the piston which causes the charge to fill out and seat into the shell cavity after which the injection port is closed by injection port cutoff 72 and 73. The resulting containerized ingot is then cooled and the closed injection and scavenging ports may optionally be sealed by one of the methods previously described.

I claim:

1. A method of making a containerized ingot having an outer metal shell and a metal core, the metal of the core having a higher thermal coefficient of expansion and a lower melting point than the metal of the shell, the method comprising: making the metal which is to constitute said shell in the shape of an enclosure with at least one injection port and at least scavenging port, injecting the core metal in a molten condition with an excess of said metal by way of said at least one injection port into said shell, ejecting said excess of said core metal with oxides and other contaminants from said shell by way of said at least one scavenging port, closing said scavenging port, closing said at least one injection port.

2. The method of claim 1 in which pressure is applied to the molten core metal to stretch and expand the shell after the at least one scavenging port is closed.

3. The method of claim 1 in which compressive pressure is applied to the containerized ingot to compress the shell against the core as said core shrinks during cooling.

4. The method of claim 1 in which the at least one injection port and the scavenging port are closed by welding.

5. The method of claim 1 in which the at least one injection port and the at least one scavenging port are closed by clamping means during reheating, forming and reforming said containerized ingot.

6. A method of making a containerized ingot having an outer metal shell and a metal core, the metal of the core having a higher thermal coefficient of expansion and a lower melting point than the metal of the shell, the method comprising: making the metal which is to constitute said shell in the shape of an enclosure with at least one injection port and at least one scavenging port, extruding the core metal in a plastic condition with an excess of said metal by way of said at least one injection port into said shell, ejecting said excess of said core metal with oxides and other contaminants from said shell by way of said at least one scavenging port, closing said at least one scavenging port, closing said at least one injection port.

7. The method of claim 6 in which pressure is applied to the plastic core metal to stretch and expand the shell after the at least one scavenging port is closed.

8. The method of claim 6 in which compressive pressure is applied to the containerized ingot to compress the shell against the core as said core shrinks during cooling.

9. The method of claim 6 in which the at least one injection port and the at least one scavenging port are closed by welding.

10. The method of claim 1 in which the at leas one injection port and the at least one scavenging port are closed by clamping means during reheating, forming and reforming said containerized ingot.

* * * * *